United States Patent [19]

Frostad

[11] Patent Number: 4,998,506
[45] Date of Patent: Mar. 12, 1991

[54] PIGGY DECK

[76] Inventor: Joseph R. Frostad, Box 331, Bentley, Alberta, Canada, T0C 0J0

[21] Appl. No.: 197,720

[22] Filed: May 23, 1988

[51] Int. Cl.⁵ .............................................. A01K 1/00
[52] U.S. Cl. ........................................ 119/18; 119/19
[58] Field of Search ................. 119/17, 18, 19, 52 AF

[56] References Cited

U.S. PATENT DOCUMENTS

| | | | |
|---|---|---|---|
| 2,745,381 | 5/1956 | Wallace et al. | 119/52 AF |
| 2,789,531 | 4/1957 | Diefendorf | 119/19 |
| 3,429,297 | 7/1969 | Schroer | 119/17 |
| 3,604,398 | 9/1974 | Peardon | 119/18 |
| 3,658,031 | 4/1972 | Coe | 119/18 |
| 3,690,301 | 9/1972 | Bruggeman et al. | 119/18 |
| 3,738,325 | 6/1973 | Wittern et al. | 119/18 |
| 3,771,686 | 11/1973 | Brison | 119/19 |
| 3,776,191 | 12/1973 | Muaro | 119/52 AF |
| 3,779,210 | 12/1973 | Blair | 119/18 |
| 3,796,189 | 3/1974 | Blondeel | 119/18 |
| 3,862,620 | 1/1975 | Bernhard | 119/17 |
| 3,924,371 | 12/1975 | Holman | 119/18 |
| 4,419,962 | 12/1983 | Siciliano | 119/17 |

Primary Examiner—Paul J. Hirsch
Attorney, Agent, or Firm—William R. Hinds

[57] ABSTRACT

In general, cages for young pigs or other animals are either unsanitary or do not provide protection from the elements, i.e. a warm dry and draft free environment. A simple solution to these problems is provided by a unitary two-piece housing with a generally rectangular base, a feed trough on the top front end of the base, a removable perforate floor which is easy to wash, a liquid waste storage and a controlled discharge drain outlet, a cover mounted on the base with an open front end, and a skeletal rod or wire gate for closing the open front end slidably and pivotally mounted in the cover for movement between a closed position in the open front end and an open position permitting easy access to the animals. The gate prevents soiling of the feed trough by the animals in the housing, and the stall configuration reduces competition at feeding times. The feed trough is further designed to distribute liquid feed equally along the length of the housing.

8 Claims, 7 Drawing Sheets

PIGGY DECK

BACKGROUND OF THE INVENTION

This invention relates to a housing for small animals, and in particular to a housing for small pigs.

In general, modern confinement hog barns represent substantial improvements over older ill equipped facilities. Great strides have been achieved in the areas of diet, feed handling, ventilation, housing and waste disposal. The improvements are intended to provide a healthy environment in which animals can thrive. Obviously, year round control of the animal rearing environment is to be preferred.

In spite of all of the advances in the design of buildings and equipment, newly weaned pigs are not given adequate care. For example, present pig weaner pens are designed to accommodate self-feeders, i.e. demand feeding. The current conventional wisdom is that the feed intake of newly weaned pigs should be limited until their digestive systems have made the adjustment from milk to solid foods. Inproper care in this area may result in pig deaths, but more often causes permanent setbacks in growth rate. Such setbacks represent a significant obstacle to efficient pork production.

Other areas deserving of special consideration include temperature control and sanitation. Even in cold climates, the temperature of the animal's environment should be 87-90° F., and preferably draft free. Commonly animals soil their own food Elimination of this problem is important.

Small animal cages or housings have been proposed previously. Examples of such proposals are found in Canadian Pat. Nos. 922,184, issued to F. Bruggeman et al on Mar. 6, 1973; 974,633, issued to J. R. Benny on Oct. 7, 1975 and 1,034,446, issued to R. Laliberte on July 11, 1978 and U.S. Pat. No. 4,173,947, issued to J. V. Whiteside, Jr. on Nov. 13, 1979. It is submitted that the patented cages do not meet the needs set out above.

An object of the present invention is to overcome the disadvantages of existing devices by providing a relatively portable simple, more or less draft free, sanitary, easy to clean environment for small animals.

Another object of the invention is to provide an animal cage or housing, which ensures that there is no soiling or contamination of feed by the animals.

BRIEF SUMMARY OF THE INVENTION

Accordingly, the present invention relates to a housing for young animals comprising unitary casing means defining an enclosure having top, bottom, side and rear end walls, and an open front end; grid floor means in said casing means above said bottom wall for supporting the animals; feeding trough means in the open front end of said casing means above and in front of said floor means; gate means in said open front end of said casing means for retaining an animal in said casing means and for preventing soiling of said trough means by the animal; and track means in said casing means slidably supporting said gate means for movement between a closed position in which the gate means blocks said open front end, and an open position in which the gate means is remote from said front opening.

DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENT(S)

Figure 8:
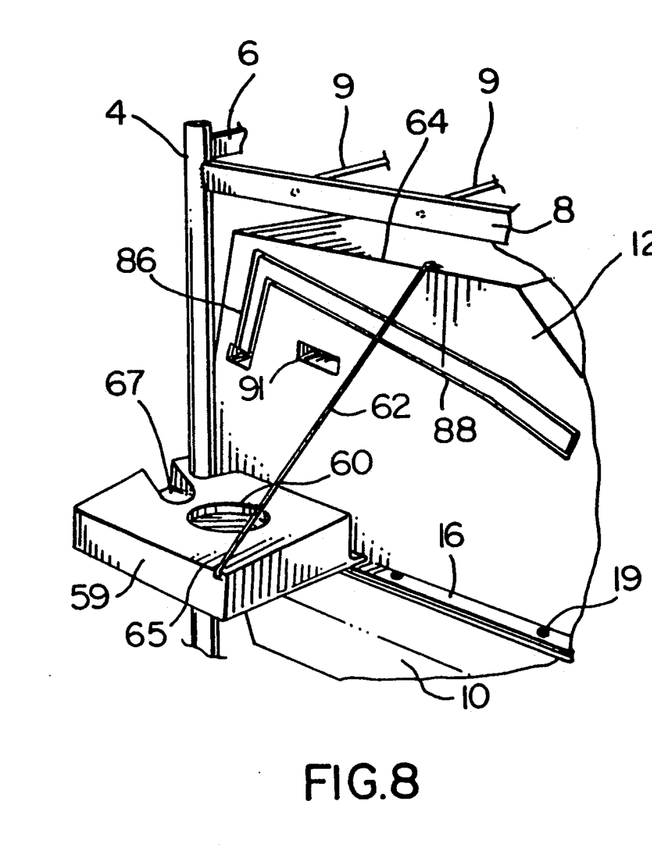
FIG. 8 is a perspective view of a feed container holding tray and one end of the device of FIGS. 1 and 2.

With reference to the drawings, the housing of the present invention includes a two-piece casing generally indicated at 1 which is mounted on a rack 2 with other similar casings 1, so that the housing can be used with a plurality of other housing in horizontal rows. The rack 2 is defined by front and rear legs 4 and 5, respectively, longitudinally extending front and rear bars 6 and 7, respectively, crossbars 8 extending between the legs 4 and 5 near the top and bottom ends thereof, and rods 9 (FIG. 8) extending between the crossbars 8 for supporting the casing 1.

Each casing 1 is a unitary structure defined by a base 10 and a cover 12. A flange 13 extends outwardly from the top of the side and rear walls 14 and 15, respectively of the base 10 for supporting a similar flange 16 extending outwardly from the bottom of the side and rear walls 17 and 18, respectively of the cover 12. The flanges 13 and 16, and consequently the base 10 and cover 12 are held together by screws 19 extending through such flanges 13 and 16.

Figure 4:
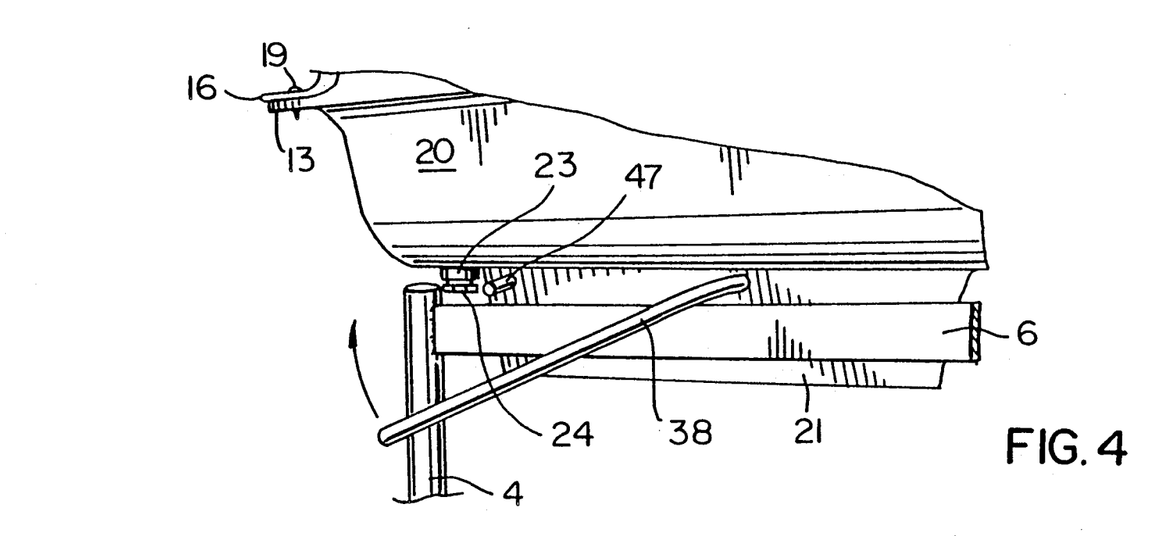
FIG. 4 is a perspective view of one front corner of a housing of the type illustrated in FIGS. 1 to 3.

A deep, generally U-shaped trough 20 is provided on the outer top edge of the vertical front wall 21 of the base 10. The trough 20 is intended to support a feeding trough 22, which is described hereinafter in greater detail. A drain 23 (FIG. 4) with a threaded cap 24 therein is provided at one end of the trough 20 for draining the latter.

Figure 1:
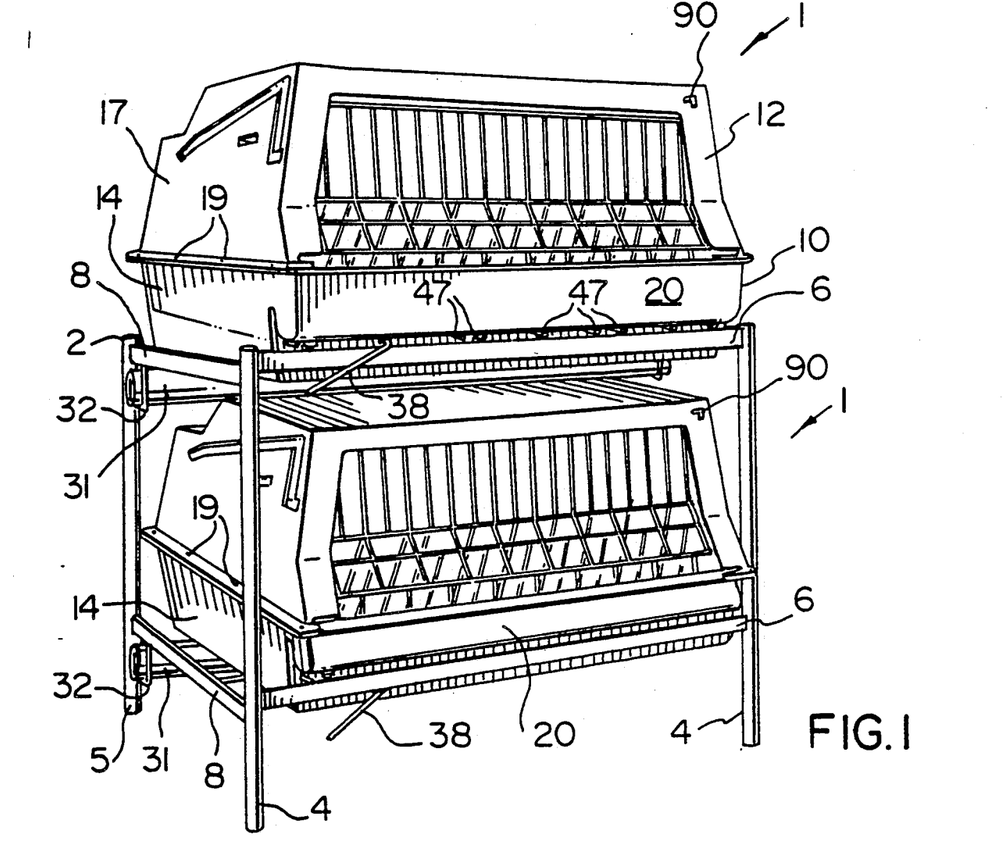
FIG. 1 is a perspective view from the front and one end of a pair of small animal housings in accordance with the present invention on a rack.
Figure 2:
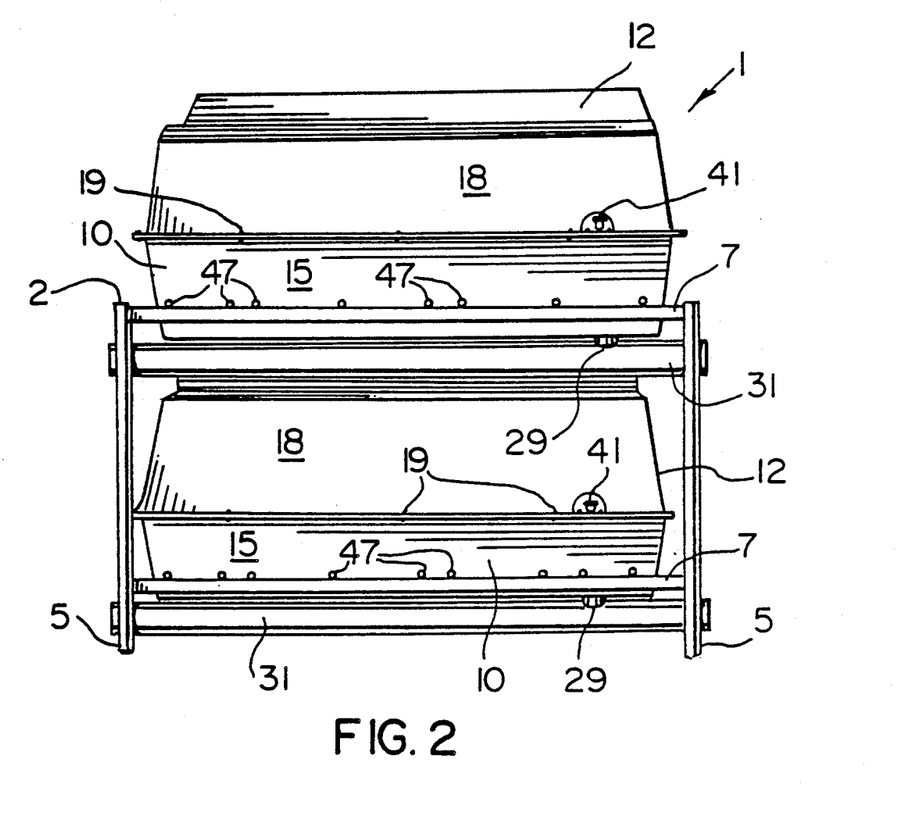
FIG. 2 is a rear elevational view of the housings and rack of FIG. 1.

A longitudinally extending waste storage and discharge trough 25 (FIGS. 3 and 5) is provided at the rear end of the rearwardly sloping bottom wall 26 of the base 10 for draining liquid 28 from the casing 1. A drain outlet 29 is provided at one end of the trough 25 for discharging the liquid from the base 10. The outlet 29 is in fluid communication with a larger pipe 31 extending the length of the rack 2. Thus, the contents of a plurality of casings 1 arranged in side-by-side relationship on the rack 2 can be discharged through a common manifold or pipe 31. The pipe 31 is supported by an L-shaped bracket 32 (FIG. 1) extending between the crossbar 8 and a rear leg 5 of the rack 2. The outlet 29 is normally closed by a tubular stopper or plug 33, with a tapered bottom end to facilitate insertion. The plug 33 is moved between the open and closed positions by a lever 34 defined by a pair of L-shaped arms and a rod 35. One end of each arm is connected to the plug 33, and the other end is welded to the rod 35. The rod 35 is mounted in the base 10 of the casing 1. The rod 35 extends through the front and rear walls 21 and 15 of the base 10, and includes a bent outer front end or handle 38 for rotating the rod, and consequently the lever 34 to remove or insert the plug 33. The use of a tubular plug 33 permits fluid overflow into the drain outlet 29 should the fluid level in the base 10 rise above the top end of the plug 33. Fresh water for drinking purposes is introduced into the casing 1 through a tube 40 and a nipple or nozzle 41 in the rear wall 18 of the casing cover 12.

An elevated floor generally indicated at 43 (FIGS. 1, 5 and 6) is provided in the base 10 of the casing 1. The floor 43 is defined by a plurality of juxtaposed, longitudinally extending, perforate, plastic panels 44. In this case, the term "perforate" is intended to mean a panel 44 with longitudinally extending slots 46. The use of a plurality of panels 44 facilitates removal of the floor 43 for cleaning. The slots 46 are sufficiently large to permit easy passage of liquid and/or manure through the floor, but small enough that the animals' feet do not become stuck or pass therethrough. The panels 44 are supported on a plurality of parrallel, spaced apart rods 47 (FIGS. 1, 2, 4 and 5) extending between the front and rear walls 21 and 15, respectively of the casing base 10.

Figure 5:
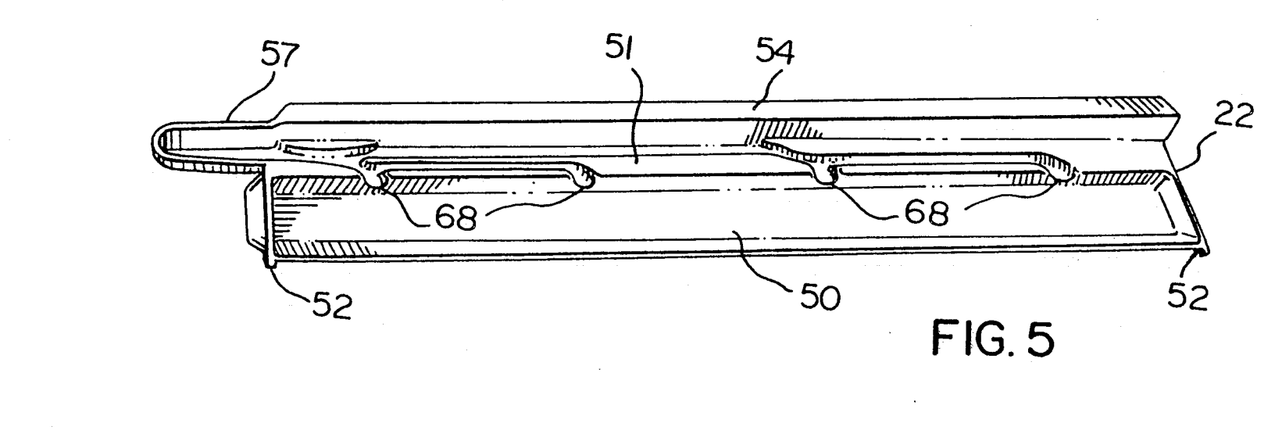
FIG. 5 is a perspective view from above and one end of a feeding trough used in the device of FIGS. 1 to 5.
Figure 6:
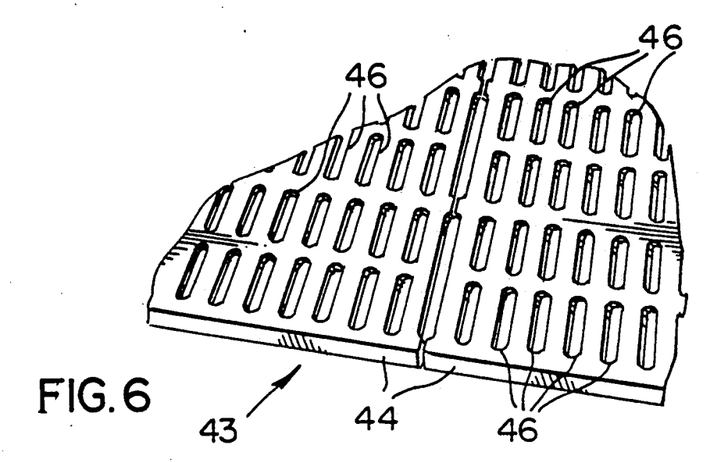
FIG. 6 is a perspective view from above and one end of a floor used in the device of FIGS. 1 to 5.
Figure 7:
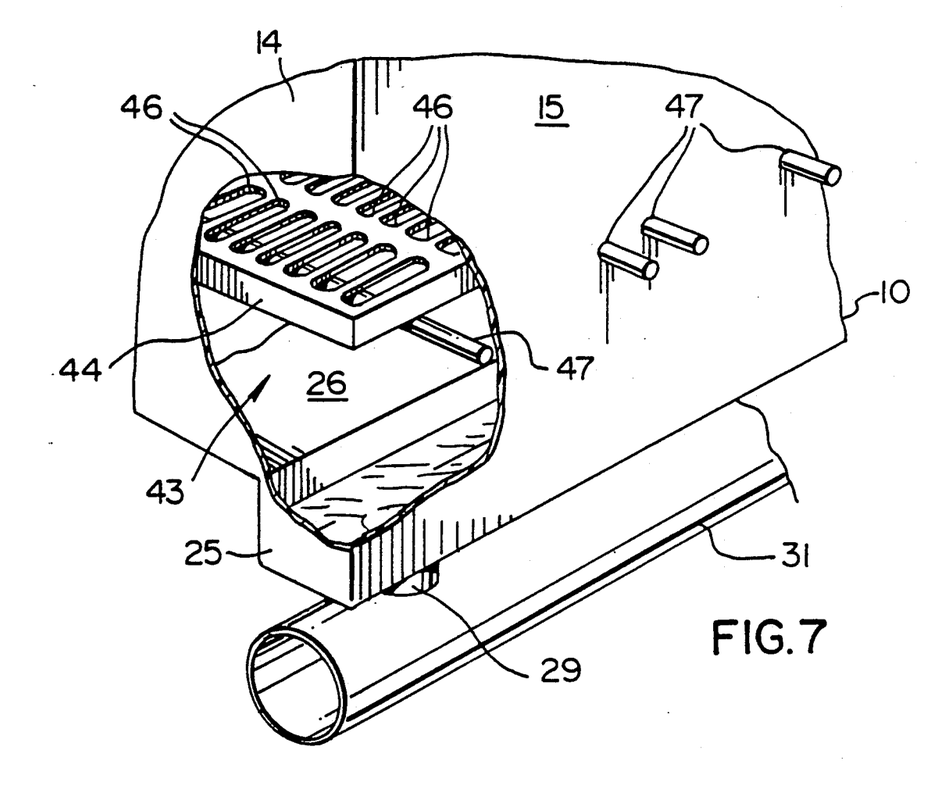
FIG. 7 is a partly sectioned perspective view of a rear corner of a housing of the type illustrated in FIGS. 1 to 3.

Referring to FIG. 5, the feed trough 22 includes a tray portion 50 for receiving liquid feed and a ledge or shoulder 51 integral with the tray 50. The channel or flute in which the liquid feed flows is designed in such a manner as to divide the flow into equal streams, in the embodiment shown, four. The outlets 68, feeding trough 50. Lugs 52 extend outwardly from the flanged, inner, top edge of the tray 50 for mounting the tray portion 50 in the main trough 20, with the lugs 52 engaging the top end of the front wall 21 of the casing base 10. A flange 54 extends upwardly and outwardly from the shoulder 51 for mounting the outer edge of the trough 20 on an outwardly extending flange 55 (FIG. 3) on the outer top end of the trough 18. When the tray portion 50 is mounted in the base 10 of the casing 1, an inlet chute 57 at one end of the shoulder 51 extends outwardly between the base 10 and cover 12 of the casing 1 for receiving liquid feed from a feed dispenser (not shown) which is mounted on a tray 59 (FIG. 8) at one end of the casing 1. The tray 59 is basically rectangular, with a recess 60 for receiving the dispenser. The tray 59 is supported on one end flange 16 of the cover 12 and is retained in position by a rod 62 with hooked ends extending between one top edge 64 of the cover 12 and the outer rear edge 65 of the tray 59. An inclined groove 67 in the front of the tray 59 is used to discharge liquid feed into the chute 57 of the feed tray. The chute 57 is in fluid communication with channels 68 in the shoulder 51 for discharging liquid feed along the length of the casing 1 at locations which are approximately equidistant from each other. Thus, liquid feed is discharged into the tray 50 along substantially the entire length thereof permitting equal access to such feed by a greater number of animals housed in the casing 1.

Figure 9:
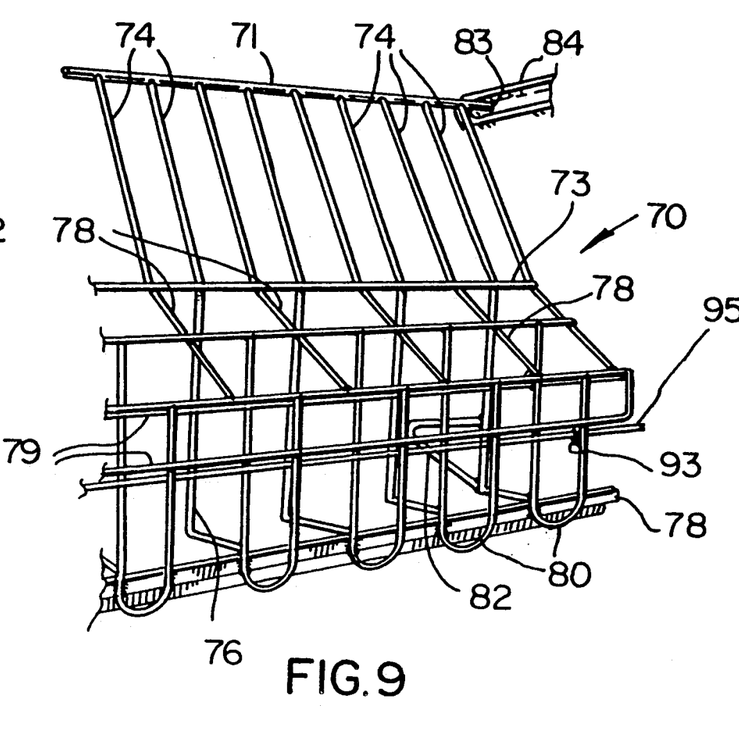
FIG. 9 is a front perspective view of a gate used in the housing of FIGS. 1 to 3.
Figure 10:
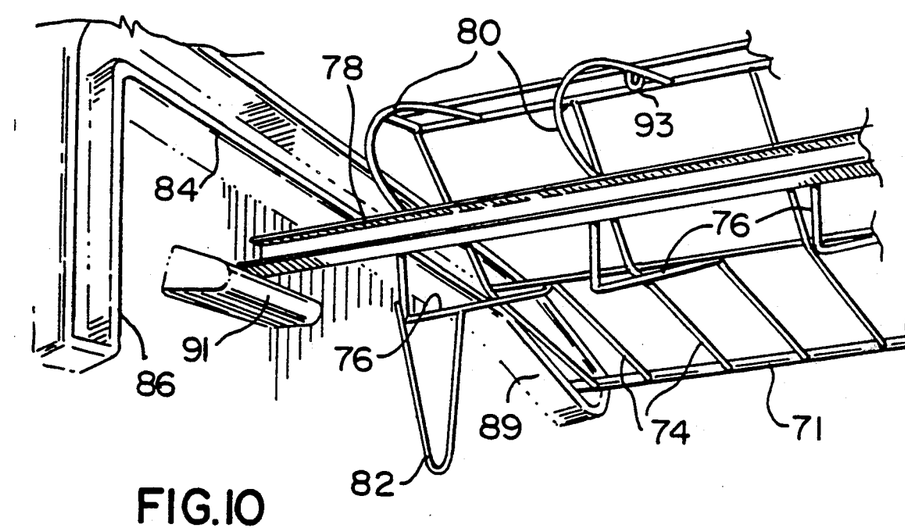
FIG. 10 is a perspective view from below of one end of the gate of FIG. 9 in a swing-away position.

The front opening of the casing 1 is normally closed by a wire or rod gate generally indicated at 70 in FIGS. 9 and 10. The gate 70 includes a slightly inclined top portion defined by a top bar 71, a bottom bar 73 and a plurality of inclined rods 74 extending therebetween. Alternate rods 74 include generally L-shaped bottom portions 76 extending downwardly and rearwardly, and then forwardly to the top of a base 78 of the gate 70. The base 78 is defined by an inverted J-shaped channel member, which in the closed position of the gate comes to rest on the inner top edge of the trough 20 (FIG. 3) or feed trough 22. The remaining rods 74 include forwardly and downwardly inclined bottom portions 78, the lower ends of which are connected to a front wall defined by longitudinally extending rods 79, and generally U-shaped vertical partitions 80. The bottom end of the rear arm of each partition 80 is welded to the base 78 for supporting the latter, and to the front bottom end of the bottom portion 76 of the rod 74. A generally V-shaped rod 82 extends inwardly from the rod 76 near each end of the gate 70, so that small animals are prevented from soiling the extreme ends of the trough 20 or tray portion 50.

Figure 3:
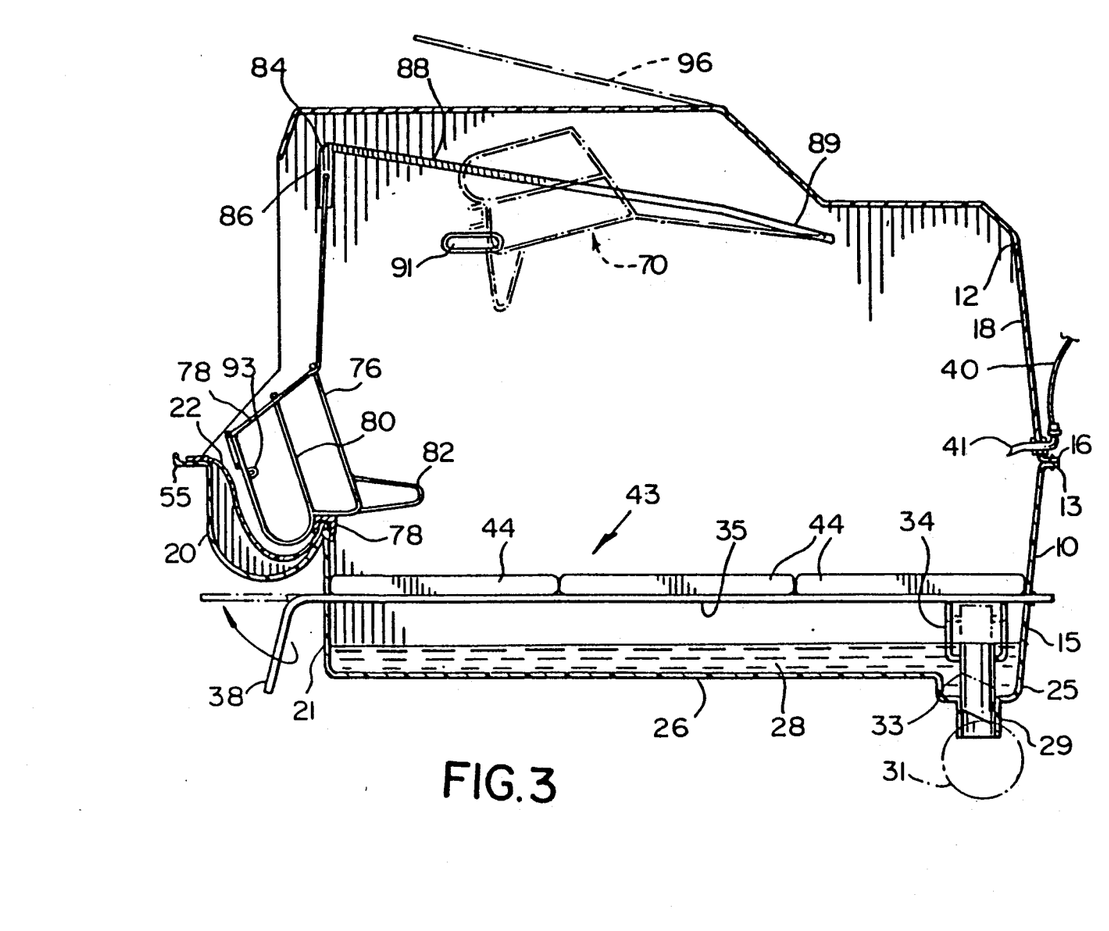
FIG. 3 is a cross-sectional view of a housing of the type illustrated in FIGS. 1 and 2.
Figure 11:
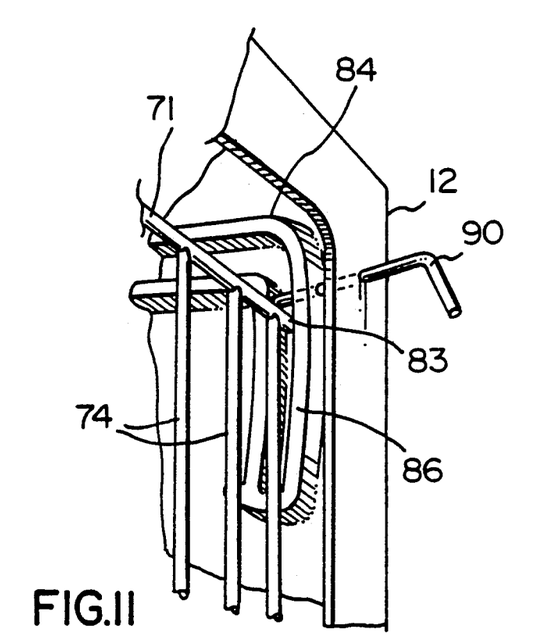
FIG. 11 is a perspective view from below of the other end of the gate of FIG. 10.

The ends 83 of the gate top bar 71 extend outwardly a short distance beyond the ends of the gate for slidably and pivotally mounting the gate in a track 84 in each end wall of the cover 12. As best shown in FIGS. 3, 10 and 11, the track 84 includes a substantially vertical front portion 86, a rearwardly and downwardly inclined main portion 88, and a more steeply inclined rear portion 89. An L-shaped rod 90 extends through the top end of the front wall of the cover 12 to define a latch for retaining the gate 70 in the closed position (FIG. 11).

When the rod 90 is removed from the locking position, the top end of the gate, 70, i.e. the top bar 71 can be moved upwardly and rearwardly in a space saving fashion to the substantial horizontal open position shown in phantom outline in FIGS. 3 and 10. In the open position, the bottom or front end of the gate 70 rests on small ledges 91 (FIGS. 3 and 10) extending inwardly from each end of the cover 12 beneath the track 84. Small loops or eyelets 93 (one shown) are provided on the rear side of the front arm of some of the partitions 80 for supporting a rod 95 (FIG. 9). The rod 95 is intended to limit access of the animals in the casing 1 to the ledge or shoulder portion 51 of the feeding trough 22, so that the animals cannot feed from the immediate area where the liquid food enters the tray 50.

A modification of the invention illustrated in phantom outline in FIG. 3 includes a ventilation opening (not shown) in the top wall of the cover 12 which is usually closed by a lid 96 pivotally connected to the cover at the rear edge of the opening.

It will be appreciated that while the casing 1 can be a one-piece molding, it is somewhat easier and useful to mold two separate flanged elements and then connect the pieces together to form a unitary structure. This facilitates stacking for shipping. The closed casing with an open front end prevents drafts and keeps the body heat of the animals in the casing, so that it is easier to maintain the temperature in the housing at a desired level. Like the casing 1, the smooth molded feed trough 22 is easy to clean. The stepped top rear edge of the casing 1 facilitates stacking on a rack 2 with the drain pipe 31 of one housing overlying the subjacent casing, so that the entire housing is in the rack. The drain pipe 31 can be connected to existing barn sewage systems.

The one-piece, molded, plastic base 10 of the casing 1 does not deteriorate in potentially corrosive conditions and serves as a draft barrier for the bottom of the housing. It is a simple matter to remove the drain plug 33 for washing and/or disinfecting the casing 1 between litters of pigs. The base 10 can carry a large volume of water, and tubular plug 33 permitting spilled drinking water and sewage to overflow continuously. The use of water 28 on the bottom of the base 10 reduces the likelihood of manure dropping through the floor 43 becoming a breeding ground for flies. Moreover, sewage gases in the barn are reduced because the manure is in the casing 1 for a relatively short time in a diluted condition.

The use of separate, readily removable, plastic floor panels 44 makes it relatively easy to clean the floor of the housing as the entire floor can be slid intact out of the housing for ease of washing. Of course, the panels 44 are re-usable.

What is claimed is:

1. A housing for young animals comprising an upper unitary cover means having top, side and rear walls and having an open front, said walls being of solid material so as to eliminate unwanted air drafts therethrough, front gate means operationally attached to said cover means by tracks carried by an upper part of the cover means, said tracks slidably supporting said gate means for movement between a closed position blocking said open front and an open position in which the gate means is remote from said open front, a lower unitary base means connected to said cover means and having bottom, side and rear walls and front through means, excrement-pervious floor means supported in said base means above said bottom wall for supporting an animal, said base means being formed of liquid-impervious material and configured such that water or other liquids can be selectively retained therein beneath said floor means, selectively operable drain means for draining said base means, said front through means being located above and in front of said floor means, and said gate means being configured to retain an animal in the housing while permitting feeding access of the animal to said trough means and preventing an animal from soiling the trough means.

2. A housing according to claim 1, wherein said floor means includes rod means extending between opposed walls of said housing; and panel means supported by said rod means, said panel means being removable from said housing for cleaning.

3. A housing according to claim 1 wherein said drain means includes outlet duct means in the bottom wall of said base means; plug means normally closing said outlet duct means; and lever means for removing said plug means to drain said base means and fore reinserting said plug means.

4. A housing according to claim 3, wherein said plug means is a hollow tube permitting the overflow of liquid in said base means into the outlet duct when the liquid rises above the top of the plug means in its duct closing position.

5. A housing according to claim 1, including latch means for locking the gate means in the closed position.

6. A housing according to claim 1, wherein said trough means includes a feeding tray for removable mounting in support trough means carried by said base means; ledge means integral with said tray; and channel means in said ledge means for feeding liquid feed to a plurality of locations along the entire length of said tray.

7. A housing according to claim 1, wherein said gate means includes arm means at each end thereof for denying access of the animal to the front corners of said base means and cover means, whereby soiling of feed in said trough means is prevented.

8. A housing according to claim 7, wherein said gate means includes partition means dividing the area above said trough means into discrete feeding areas, each accessible to one animal only.

* * * * *